United States Patent
Altolaguirre et al.

(10) Patent No.: US 8,498,085 B2
(45) Date of Patent: Jul. 30, 2013

(54) ESD PROTECTION CIRCUIT

(75) Inventors: Federico A. Altolaguirre, Kaohsiung (TW); Ming-Dou Ker, Kaohsiung (TW); Chua-Chin Wang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 13/589,285

(22) Filed: Aug. 20, 2012

(65) Prior Publication Data

US 2013/0057992 A1    Mar. 7, 2013

(30) Foreign Application Priority Data

Sep. 7, 2011   (TW) .............................. 100132324 A

(51) Int. Cl.
  *H02H 9/00*    (2006.01)
  *H01C 7/12*    (2006.01)
  *H02H 1/00*    (2006.01)
  *H02H 1/04*    (2006.01)
  *H02H 3/22*    (2006.01)

(52) U.S. Cl.
  USPC ............................................ 361/56; 361/118

(58) Field of Classification Search
  USPC .................................................... 361/56, 118
  See application file for complete search history.

(56) References Cited

U.S. PATENT DOCUMENTS

| 8,400,742 | B2 * | 3/2013 | Lai et al. | 361/56 |
| 2010/0277841 | A1 * | 11/2010 | Riviere et al. | 361/56 |

* cited by examiner

*Primary Examiner* — Dharti Patel
(74) *Attorney, Agent, or Firm* — Jackson IPG PLLC

(57) ABSTRACT

An ESD protection circuit with leakage current reduction function includes a silicon controlled rectifier, a first CMOS inverter, a first transistor, a current mirror, a PMOS capacitor and a resistor. The first CMOS inverter electrically connects with the silicon controlled rectifier. The first transistor comprises a first end, a second end and a third end, wherein the first end electrically connects with the silicon controlled rectifier and the first CMOS inverter, and the current mirror electrically connects with the third end of the first transistor. The PMOS capacitor electrically connects with the current mirror, and the resistor electrically connects with the first CMOS inverter, the second end of the first transistor and the PMOS capacitor.

12 Claims, 6 Drawing Sheets

ESD PROTECTION CIRCUIT

FIELD OF THE INVENTION

The present invention is generally related to an ESD protection circuit, which particularly relates to the ESD protection circuit with smaller layout area and leakage current reduction functions.

BACKGROUND OF THE INVENTION

A conventional ESD protection circuit 200 as illustrated in FIG. 6 includes an RC circuit 210, a CMOS inverter 220 electrically connected with the RC circuit 210, and a silicon controlled rectifier 230 electrically connected with the CMOS inverter 220. A traditional ESD detection can be achieved through combination of the RC circuit 210 and MOS capacitors owning to the reason that MOS capacitors possess the largest capacitance per unit area in the CMOS processes. However, with advanced process in semiconductor industry entering a nanoscale era, the gate oxide layer of the MOS device in nanoscale CMOS technology gradually becomes thinner and thinner, which results in severe gate leakage current of the MOS device caused by gate tunneling effect so as to make relative circuits perform a failed operation.

SUMMARY

The primary object of the present invention is to provide an ESD protection circuit including a silicon controlled rectifier, a first CMOS inverter, a first transistor, a current mirror, a PMOS capacitor and a resistor. The first CMOS inverter electrically connects with the silicon controlled rectifier. The first transistor comprises a first end, a second end and a third end, wherein the first end electrically connects with the silicon controlled rectifier and the first CMOS inverter, and the current minor electrically connects with the third end of the first transistor. The PMOS capacitor electrically connects with the current mirror. The resistor electrically connects with the first CMOS inverter, the second end of the first transistor and the PMOS capacitor. By integrating the current minor with the first transistor, when an electrostatic discharge (ESD) phenomenon occurs in the ESD protection circuit, the first transistor operates in a conduction state so as to amplify the equivalent capacitance produced from the current minor. Therefore, sufficient RC constant ensures that the first CMOS inverter does not shut down too soon. Also, sufficient RC constant makes the silicon controlled rectifier maintained in a conduction state to lastingly provide an electrostatic discharge path for safely discharging ESD phenomena. The present invention utilizes the first transistor acted as a control switch and the capacitance amplification feature of the current minor, therefore, a chip layout area and a leakage current for the ESD protection circuit of the present invention can be effectively reduced.

DETAILED DESCRIPTION OF THE INVENTION

Figure 1:
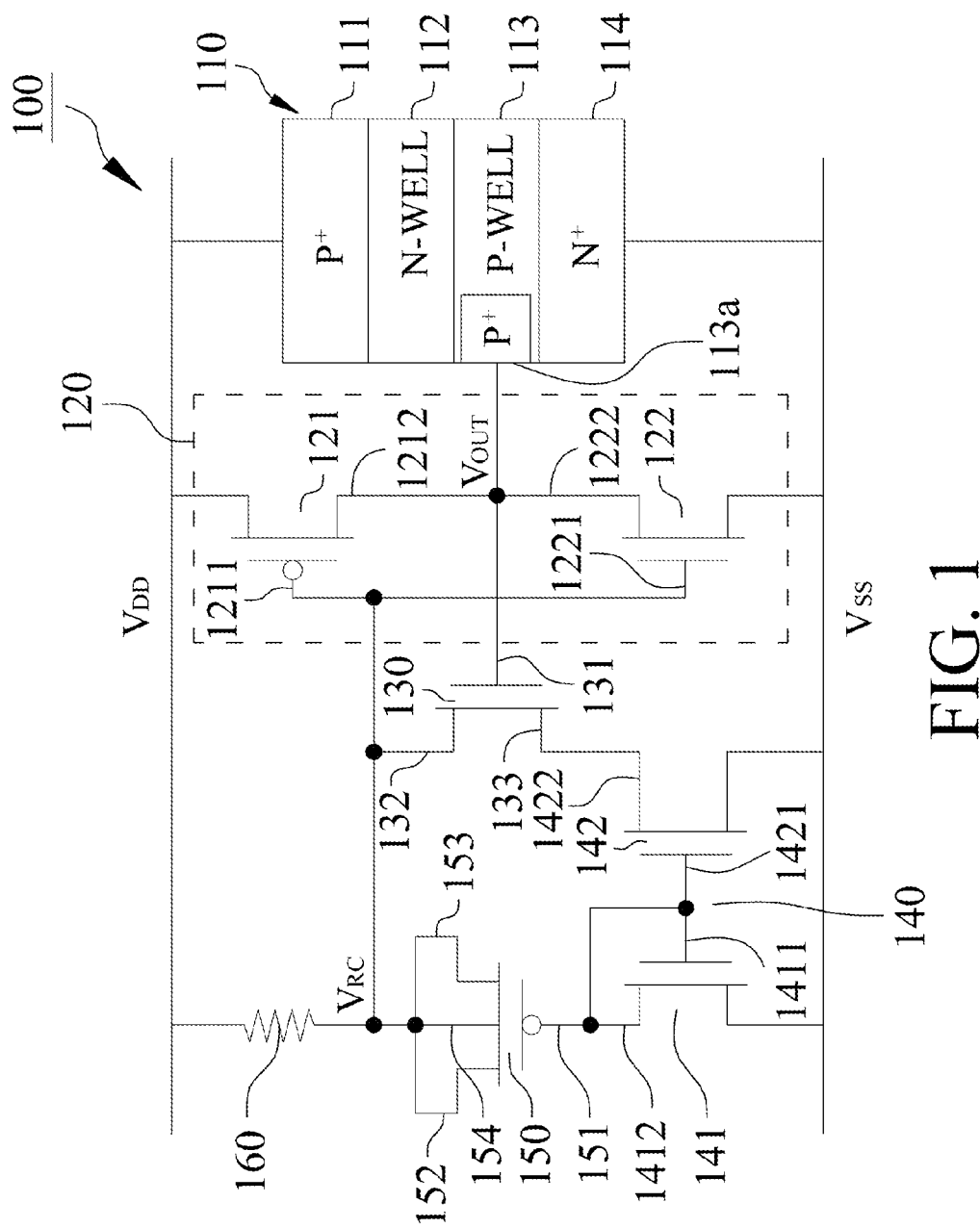
FIG. 1 is a circuit diagram illustrating an ESD protection circuit in accordance with a first embodiment of the present invention.

With reference to FIG. 1, an ESD protection circuit 100 in accordance with a first embodiment of the present invention includes a silicon controlled rectifier 110, a first CMOS inverter 120, a first transistor 130, a current mirror 140, a PMOS capacitor 150 and a resistor 160, wherein the first CMOS inverter 120 electrically connects with the silicon controlled rectifier 110. The first transistor 130 comprises a first end 131, a second end 132 and a third end 133, wherein the first end 131 electrically connects with the silicon controlled rectifier 110 and the first CMOS inverter 120, and the current mirror 140 electrically connects with the third end 133 of the first transistor 130. The PMOS capacitor 150 comprises a fourth end 151, a fifth end 152 and a sixth end 153, the fourth end 151 of the PMOS capacitor 150 electrically connects with the current mirror 140, and the resistor 160 electrically connects with the first CMOS inverter 120, the second end 132 of the first transistor 130, the fifth end 152 and the sixth end 153 of the PMOS capacitor 150. In this embodiment, the silicon controlled rectifier 110 is a substrate triggered silicon controlled rectifier (STSCR) utilized as an ESD clamping device. The first end 131 of the first transistor 130 is a gate electrode, the second end 132 is a drain electrode, the third end 133 is a source electrode, and the first transistor 130 is an NMOS transistor. Besides, the fourth end 151 of the PMOS capacitor 150 is a gate electrode, the fifth end 152 is a drain electrode, and the sixth end 153 is a source electrode. In this embodiment, the PMOS capacitor 150 further comprises a body electrode 154 electrically connected with the drain electrode and the source electrode of the PMOS capacitor 150. The first transistor 130 is utilized as a control switch for closing or opening the current mirror 140. In addition, the PMOS capacitor 150 is equivalent to a capacitor $C_{MICAP}$ and provides a reference current flowing toward the current mirror 140.

With reference to FIG. 1 again, the current mirror 140 comprises a third transistor 141 and a fourth transistor 142, wherein a gate electrode 1411 of the third transistor 141 electrically connects with a drain electrode 1412 of the third transistor 141, a gate electrode 1421 of the fourth transistor 142 and the fourth end 151 of the PMOS capacitor 150, and a drain electrode 1422 of the fourth transistor 142 electrically connects with the third end 133 of the first transistor 130. In this embodiment, the current mirror 140 plays a role as an active capacitor, the third transistor 141 and the fourth transistor 142 are NMOS transistors, wherein the third transistor 141 is the sensation terminal for sensing if leakage current is occurred, and the fourth transistor 142 is the magnifying terminal for current magnification. Otherwise, the first CMOS inverter 120 comprises a fifth transistor 121 and a sixth transistor 122, wherein a gate terminal 1211 of the fifth transistor 121 and a gate terminal 1221 of the sixth transistor 122 are electrically connected with the second end 132 of the first transistor 130, the drain electrode of the PMOS capacitor 150, the source electrode of the PMOS capacitor 150 and the resistor 160, and a drain electrode 1212 of the fifth transistor 121 is electrically connected with a drain electrode 1222 of the sixth transistor 122, the silicon controlled rectifier 110 and the first end 131 of the first transistor 130. The fifth transistor 121 provides a trigger current flowing toward the silicon controlled rectifier 110 and determines closing or opening of the first transistor 130. The silicon controlled rectifier 110 includes a P+ layer 111, an N type well 112, a P type well 113, a P+ trigger node 113a formed at the P type well 113 and an N+ layer 114, wherein the P+ trigger node 113a electrically connects with the drain electrode 1212 of the fifth transistor 121, the drain electrode 1222 of the sixth transistor 122 and the first end 131 of the first transistor 130.

The primary design object in the present invention is to accomplish a capacitance amplification technique. In MOS device, the gate leakage current is directly proportional to the gate area, if the gate area is reduced, the leakage current declines substantially as well. However, a shrinking gate area may lead to an insufficient RC constant so that the silicon controlled rectifier 110 is incapable of maintaining a conduction state. Therefore, the present invention utilizes the current mirror 140 to overcome mentioned weakness. For instance, the size ratio between the third transistor 141 and the fourth transistor 142 is set to 1:N, the equivalent capacitance of the current mirror 140 will be (1+N) times amplified, which makes the ESD protection circuit 100 not only lower the leakage current, but also compensate the RC constant by increasing the equivalent capacitance. The equivalent capacitance is derived as followed:

The equation of a current flowing through the PMOS capacitor 150 is $$I_{MCAP} = C_{MCAP} \frac{d}{dt} V_{RC}$$

Wherein a voltage terminal $V_{RC}$ is a node located between the resistor 160 and the PMOS capacitor 150, a current flowing through the third transistor 141 indicates as $I_{M1}$, and a current flowing through the fourth transistor 142 indicates as $I_{M2}$. The size ratio between the third transistor 141 and the fourth transistor 142 is set to 1:N so as to obtain $$I_{M2}=N \times I_{M1}$$

The total current between the voltage terminal $V_{RC}$ and ground is $$I_{VRC}=I_{M1}+I_{M2}=(1+N)I_{M1}$$

Accordingly, an equivalent capacitance $C_{EQ}$ is obtained and indicates as below $$C_{EQ}=C_{MCAP}(1+N)$$

Figure 2:
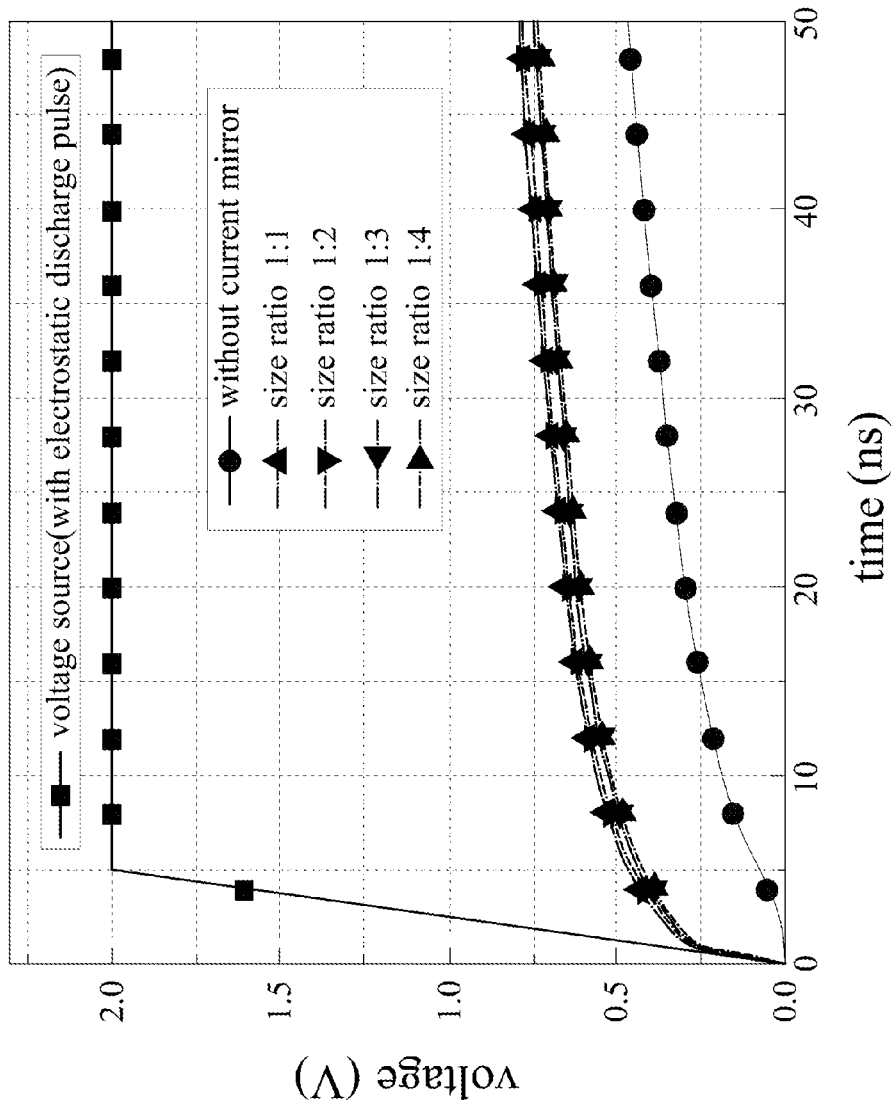
FIG. 2 is a curvature diagram illustrating an ESD phenomenon simulation of an ESD protection circuit in accordance with a first embodiment of the present invention.

With reference to FIG. 2, when the ESD phenomenon is occurred, the resistor 160, the PMOS capacitor 150 and the current mirror 140 act as an ordinary RC circuit, wherein the voltage terminal $V_{RC}$ decreases upon increase of the size ratio between the third transistor 141 and the fourth transistor 142.

Figure 3:
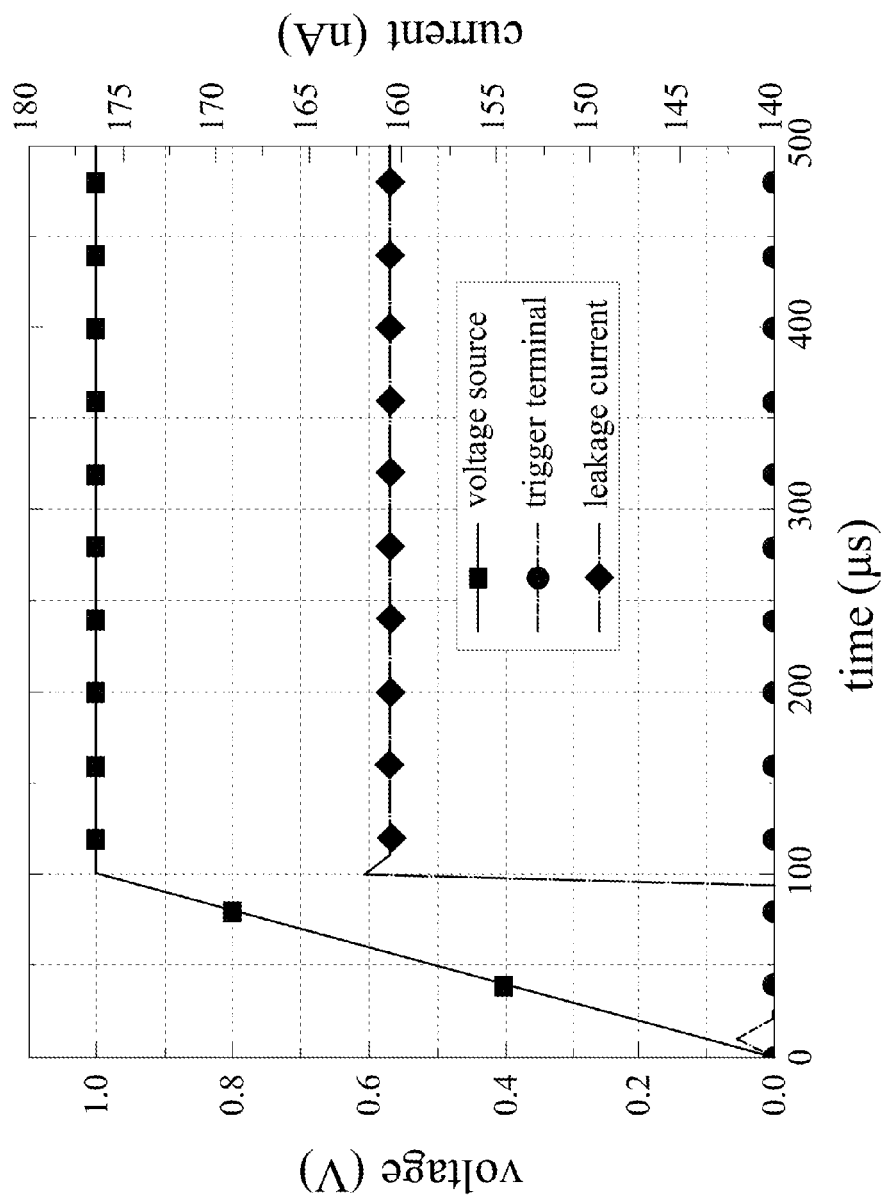
FIG. 3 is a curvature diagram illustrating a power-on transition simulation of an ESD protection circuit in accordance with a first embodiment of the present invention.

The action as regard to the ESD protection circuit 100 is illustrated as followed. In the first embodiment, when the ESD protection circuit 100 operates normally, the RC constant composed of the resistor 160 and the equivalent capacitance $C_{EQ}$ is in the order of microsecond, and the power-on transitions are in the order of milliseconds. Next, the voltage of the voltage terminal $V_{RC}$ between the resistor 160 and the PMOS capacitor 150 can follow the power-on transitions of a voltage source $V_{DD}$ in time to make the fifth transistor 121 maintained in the off state and the sixth transistor 122 maintained in the conduction state. For the sixth transistor 122 maintaining in conduction, a resistance between a trigger terminal $V_{OUT}$ and a ground terminal $V_{SS}$ becomes extremely tiny, therefore the voltage level of the trigger terminal $V_{OUT}$ can be directly regarded as the ground terminal $V_{SS}$, which ensures that the substrate triggered silicon controlled rectifier is still in the off state. The off state of the silicon controlled rectifier 110 enables to shut down the first transistor 130. Besides, under normal operation, a leakage current still exists and flows from the resistor 160, the PMOS capacitor 150 and the third transistor 141 of the current mirror 140 to the ground terminal $V_{SS}$ when the first transistor 130 is in the off state, which prevents the leakage current from being amplified by the current mirror 140 to eliminate a primary leakage path. FIG. 3 is a curvature diagram illustrating a power-on transition of the ESD protection circuit 100 in accordance with the first embodiment, when the voltage source $V_{DD}$ rises from 0V to 1V under a 100 μs time rise transition, the trigger terminal $V_{OUT}$ still remains at zero volts. The total simulated leakage current is approximately 160 nA.

With reference to FIG. 1 again, when an ESD phenomenon zaps from the voltage source $V_{DD}$ to the ground terminal $V_{SS}$, the voltage terminal $V_{RC}$ under a fast rise time (in the order of nanoseconds) is initially kept at the voltage level of the ground terminal $V_{SS}$ so that the fifth transistor 121 of the first CMOS inverter 120 is in conduction. Since the fifth transistor 121 turns on, a triggering current is injected into the silicon controlled rectifier 110 for providing a low impedance path between the voltage source $V_{DD}$ and the ground terminal $V_{SS}$.

Besides, for the trigger terminal $R_{OUT}$ maintaining at voltage level of the voltage source $V_{DD}$, the first transistor 130 enables to be in conduction. Thereafter, the fourth transistor 142 of the current mirror 140 is driven to be in conduction by the first transistor 130. Meantime, the equivalent capacitance is (1+N) times amplified derived from the derivation of mentioned equation. Accordingly, sufficient RC constant ensures that the voltage terminal $V_{RC}$ does not shut down the fifth transistor 121 too soon. Also, sufficient RC constant makes the silicon controlled rectifier 110 maintained in a conduction state to lastingly provide an electrostatic discharge path for safely discharging ESD phenomena.

Figure 4:
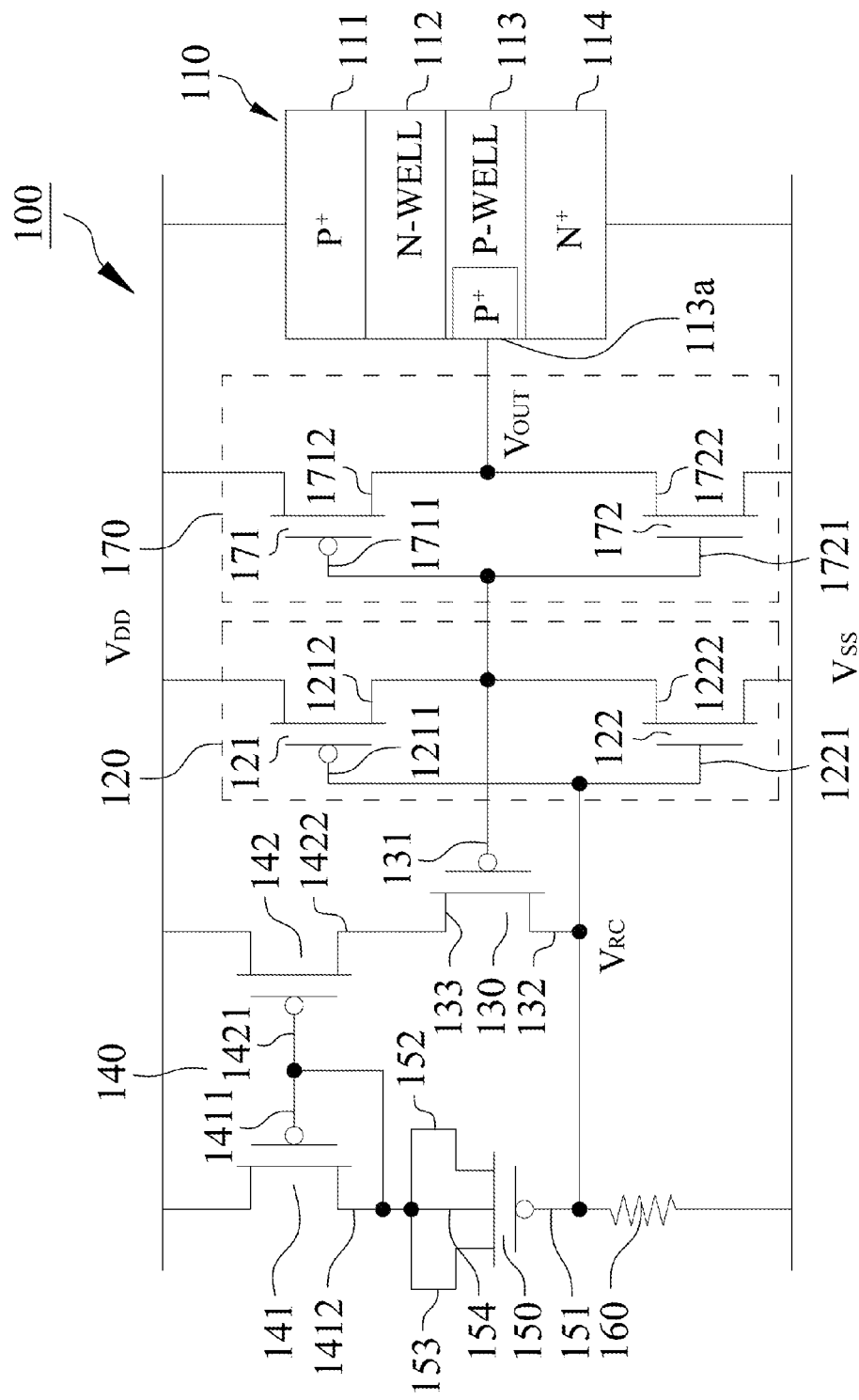
FIG. 4 is a circuit diagram illustrating an ESD protection circuit with a second embodiment of the present invention.
Figure 5:
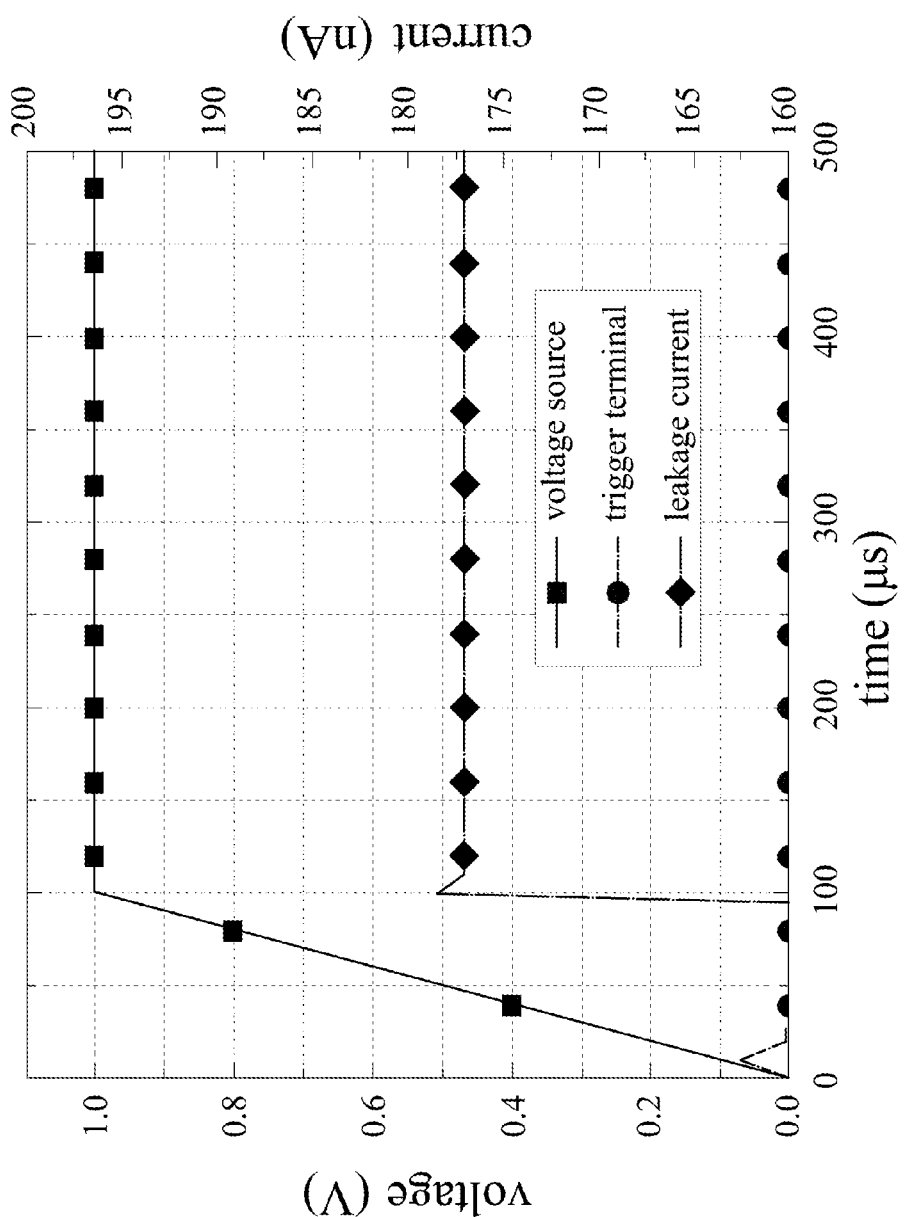
FIG. 5 is a curvature diagram illustrating a power-on transition simulation of an ESD protection circuit in accordance with a second embodiment of the present invention.
Figure 6:
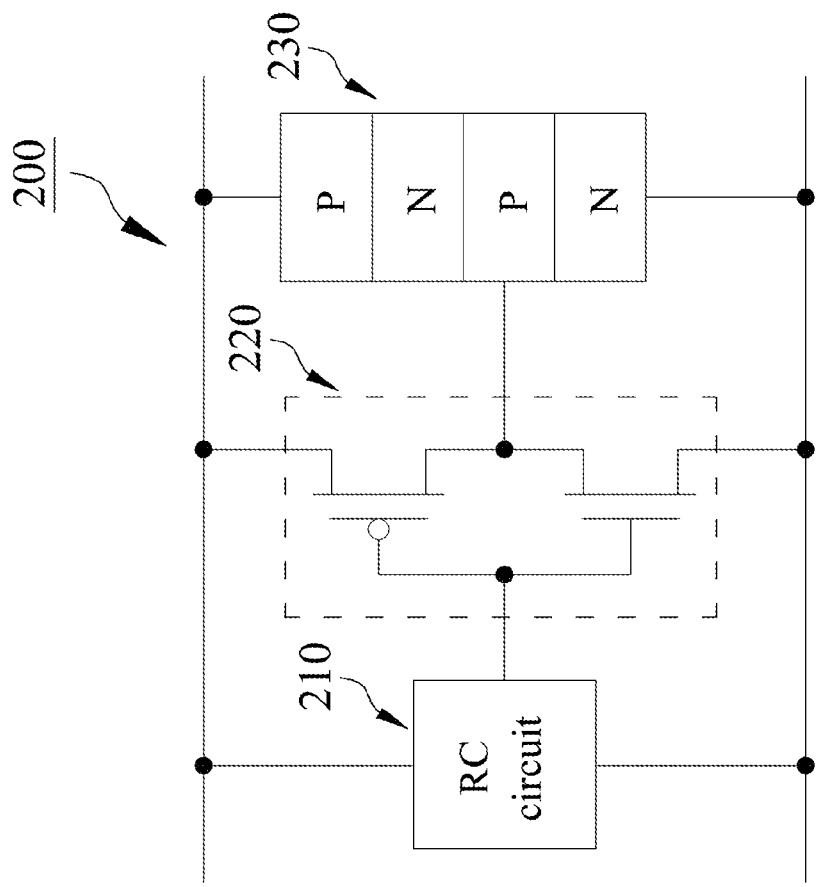
FIG. 6 is a circuit diagram illustrating a conventional ESD protection circuit.

A second embodiment of the present invention is illustrated in FIG. 4, the primary difference between the second embodiment and the first embodiment is that the first transistor 130, the third transistor 141 and the fourth transistor 142 of the current mirror 140 are PMOS transistors (the opposite type of NMOS transistor in the first embodiment). Besides, the fourth end 151 of the PMOS capacitor 150 electrically connects with the first CMOS inverter 120, the second end 132 of the first transistor 130 and the resistor 160. The fifth end 152 and the sixth end 153 of the PMOS capacitor 150 are electrically connected with the drain electrode 1412 of the third transistor 141, the gate electrode 1411 of the third transistor 141 and the gate electrode 1421 of the fourth transistor 142. Further, the gate electrode 1211 of the fifth transistor 121 and the gate electrode 1221 of the sixth transistor 122 are electrically connected with the second end 132 of the first transistor 130, the fourth end 151 of the PMOS capacitor 150 and the resistor 160. In the second embodiment, the ESD protection circuit 100 further includes a second CMOS inverter 170, the first CMOS inverter 120 is electrically connected with the silicon controlled rectifier 110 through the second CMOS inverter 170. In this embodiment, the second CMOS inverter 170 comprises a seventh transistor 171 and an eighth transistor 172, a gate electrode 1711 of the seventh transistor 171 and a gate electrode 1721 of the eighth transistor 172 are electrically connected with the drain electrode 1212 of the fifth transistor 121, the drain electrode 1222 of the sixth transistor 122 and the first end 131 of the first transistor 130, wherein a drain electrode 1712 of the seventh transistor 171 and a drain electrode 1722 of the eighth transistor 172 are electrically connected with the P+ trigger node 113a of the silicon controlled rectifier 110. FIG. 5 is a curvature diagram illustrating a power-on transition of the ESD protection circuit 100 in accordance with the second embodiment, when the voltage source $V_{DD}$ rises from 0V to 1V under a 100 µs time rise transition, the trigger terminal $V_{OUT}$ still remains at zero volts. The total simulated leakage current is 177 nA.

By integrating the current mirror 140 with the first transistor 130, when the ESD protection circuit 100 operates normally, the first transistor 130 and the fourth transistor 142 are into off state, which prevents a leakage current from being amplified by the fourth transistor 142 of the current mirror 140 to eliminate a primary leakage path under normal operation. Besides, when the electrostatic discharge (ESD) phenomenon occurs in the ESD protection circuit 100, the first transistor 130 operates in a conduction state so as to open the fourth transistor 142 of the current mirror 140, and the equivalent capacitance $C_{EQ}$ produced from the current mirror 140 is (1+N) times amplified. Therefore, sufficient RC constant ensures that the voltage terminal $V_{RC}$ does not shout down the fifth transistor 121 too soon. Also, sufficient RC constant makes the silicon controlled rectifier 110 maintained in a conduction state to lastingly provide an electrostatic discharge path for eliminating ESD phenomenon. The present invention utilizes the first transistor 130 acted as a control switch and the capacitance amplification feature from the current mirror 140, therefore, a chip layout area and a leakage current for the ESD protection circuit 100 of the present invention can be effectively reduced.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. An ESD protection circuit including:
a silicon controlled rectifier;
a first CMOS inverter electrically connected with the silicon controlled rectifier;
a first transistor having a first end, a second end and a third end, wherein the first end is electrically connected with the silicon controlled rectifier and the first CMOS inverter;
a current mirror electrically connected with the third end of the first transistor such that the first transistor opens and closes the current mirror to inhibit a leakage current from being amplified by the current mirror;
a PMOS capacitor electrically connected with the current mirror; and
a resistor electrically connected with first CMOS inverter, the second end of the first transistor and the PMOS capacitor.

2. The ESD protection circuit in accordance with claim 1, wherein the first end of the first transistor is a gate electrode, the second end is a drain electrode, and the third end is a source electrode.

3. The ESD protection circuit in accordance with claim 1, wherein the current mirror comprises a third transistor and a fourth transistor, a gate electrode of the third transistor electrically connects with a drain electrode of the third transistor, a gate electrode of the fourth transistor and the PMOS capacitor, and a drain electrode of the fourth transistor electrically connects with the third end of the first transistor.

4. The ESD protection circuit in accordance with claim 3, wherein the PMOS capacitor comprises a fourth end, a fifth end and a sixth end, the fourth end of the PMOS capacitor electrically connects with the third transistor and the fourth transistor of the current mirror, wherein the fifth end and the sixth end are electrically connected with the second end of the first transistor, the first CMOS inverter and the resistor, the fourth end is a gate electrode, the fifth end is a drain electrode, and the sixth end is a source electrode.

5. The ESD protection circuit in accordance with claim 4, wherein the PMOS capacitor further comprises a body electrode electrically connected with the drain electrode and the source electrode of the PMOS capacitor.

6. The ESD protection circuit in accordance with claim 4, wherein the first CMOS inverter comprises a fifth transistor and a sixth transistor, a gate electrode of the fifth transistor and a gate electrode of the sixth transistor are electrically connected with the second end of the first transistor, the drain electrode of the PMOS capacitor, the source electrode of the PMOS capacitor and the resistor, and a drain electrode of the fifth transistor is electrically connected with a drain electrode of the sixth transistor, the silicon controlled rectifier and the first end of the first transistor.

7. The ESD protection circuit in accordance with claim 3, wherein the PMOS capacitor comprises a fourth end, a fifth end and a sixth end, the fourth end of the PMOS capacitor electrically connects with the second end of the first transistor, the first CMOS inverter and the resistor, the fifth end and the sixth end of the PMOS capacitor are electrically connected with the third transistor and the fourth transistor of the current mirror.

8. The ESD protection circuit in accordance with claim 7, wherein the first CMOS inverter comprises a fifth transistor and a sixth transistor, a gate electrode of the fifth transistor and a gate electrode of the sixth transistor are electrically connected with the second end of the first transistor, the fourth end of the PMOS capacitor and the resistor, a drain electrode of the fifth transistor electrically connects with a drain electrode of the sixth transistor, the silicon controlled rectifier and the first end of the first transistor.

9. The ESD protection circuit in accordance with claim 6, wherein the silicon controlled rectifier includes a P type well and a P+ trigger node formed at the P type well, the P+ trigger node electrically connects with the drain electrode of the fifth transistor, the drain electrode of the sixth transistor and the first end of the first transistor.

10. The ESD protection circuit in accordance with claim 8, wherein the silicon controlled rectifier includes a P type well and a P+ trigger node formed at the P type well, the P+ trigger node electrically connects with the drain electrode of the fifth transistor, the drain electrode of the sixth transistor and the first end of the first transistor.

11. The ESD protection circuit in accordance with claim 8 further including a second CMOS inverter having a seventh transistor and an eighth transistor, a gate electrode of the seventh transistor and a gate electrode of the eighth transistor are electrically connected with the drain electrode of the fifth transistor, the drain electrode of the sixth transistor and the first end of the first transistor, wherein a drain electrode of the seventh transistor and a drain electrode of the eighth transistor are electrically connected with the silicon controlled rectifier.

12. The ESD protection circuit in accordance with claim 1, wherein the silicon controlled rectifier is a substrate triggered silicon controlled rectifier.

* * * * *